(12) United States Patent
Matsubara

(10) Patent No.: US 6,978,826 B2
(45) Date of Patent: Dec. 27, 2005

(54) HEATING AND COOLING APPARATUS, BUILDING STRUCTURE HAVING HEATING AND COOLING APPARATUS, AND METHOD OF USING HEATING AND COOLING APPARATUS

(76) Inventor: Hideo Matsubara, 1-1-1001, Kita 5-jo, Nishi 29-chome, Chuo-ku, Sapporo-shi, Hokkaido (JP)

( * ) Notice: Subject to any disclaimer, the term of this patent is extended or adjusted under 35 U.S.C. 154(b) by 196 days.

(21) Appl. No.: 10/424,604

(22) Filed: Apr. 28, 2003

(65) Prior Publication Data

US 2004/0045700 A1  Mar. 11, 2004

(30) Foreign Application Priority Data

Sep. 8, 2002  (JP) .............................. 2002-233159

(51) Int. Cl.[7] ............................................ F28D 20/00
(52) U.S. Cl. ...................... 165/48.2; 165/45; 165/48.1; 165/59; 62/260
(58) Field of Search ...................... 165/48.2, 45, 48.1, 165/58, 59, 61, 96, 98, 122; 62/260; 52/173.3, 52/169.11, 236.1–236.4

(56) References Cited

U.S. PATENT DOCUMENTS

| | | | | |
|---|---|---|---|---|
| 4,250,885 A | * | 2/1981 | van Heel | 126/620 |
| 4,420,036 A | * | 12/1983 | Blaser | 165/45 |
| 4,498,526 A | * | 2/1985 | Arenas | 165/45 |
| 5,121,789 A | * | 6/1992 | Scharfe | 165/48.2 |
| 5,524,381 A | * | 6/1996 | Chahroudi | 52/173.3 |
| 5,620,368 A | * | 4/1997 | Bates et al. | 454/186 |

FOREIGN PATENT DOCUMENTS

JP  8-219490  *  8/1996

* cited by examiner

Primary Examiner—Teresa J. Walberg
(74) Attorney, Agent, or Firm—Adams & Wilks

(57) ABSTRACT

A heating and cooling apparatus comprises a generally hollow heating and cooling tower body having a ceiling part for receiving solar heat and a columnar part for storing the solar heat received by the ceiling part. The columnar part has a lower portion adapted to be positioned in the ground for receiving a flow of cool air from the ground and a heat absorbing-and-radiating section for absorbing and radiating heat to heat the heating and cooling tower body using the stored solar heat and to cool the heating and cooling tower body using the flow cool air from the ground.

10 Claims, 11 Drawing Sheets

HEATING AND COOLING APPARATUS, BUILDING STRUCTURE HAVING HEATING AND COOLING APPARATUS, AND METHOD OF USING HEATING AND COOLING APPARATUS

BACKGROUND OF THE INVENTION

1. Field of the Invention

The present invention relates generally to a heating and cooling apparatus and, more particularly, to a heating and cooling apparatus for heating the inside of a room utilizing solar heat and cooling the inside of the room utilizing cool air in the ground. The present invention also relates to a building structure having the heating and cooling apparatus and to a method of using the heating and cooling apparatus.

2. Background Information

In a conventional heating and cooling apparatus utilizing solar heat, a panel is mounted on the roof of a building to heat water by heat exchange, and the heated water is utilized to heat the inside of a room in the building. Pipelines through which the hot water flows are arranged mainly under a floor made of, for example, concrete to heat or warm up the floor. Heat radiation from the surface of the floor surface is distributed by a fan or an air duct provided at an appropriate position to warm up the room.

However, in the conventional heating and cooling apparatus, since the heat is stored only in the concrete floor, the heat storage area is restricted and the heating efficiency is too low to heat the entire room. Furthermore, the structure of the conventional heating and cooling apparatus is complex since a fan or an air duct is required as described above. Additionally, since it can be used only for heating, the conventional heating and cooling apparatus is undesirable from an economical standpoint.

SUMMARY OF THE INVENTION

In general, a material having a high heat-retaining property, such as concrete, is able to retain heat for a long period of time after being heated. Accordingly, if this material is heated during the daytime, it can be used for heating in the nighttime. Further, it is well known that the ground temperature at a predetermined depth from the ground surface is substantially constant throughout the year. Accordingly, when the temperature in the room of a building structure is higher than the temperature in the ground, the room can be cooled by utilizing the cool air in the ground. Additionally, low-temperature materials, such as snow, can be utilized for cooling.

It is an object of the present invention to provide a heating and cooling apparatus by which heating and cooling are effectively accomplished utilizing solar heat and cool air in the ground, respectively.

It is another object of the present invention to provide an economic heating and cooling apparatus by which a large heat storage area is obtained and operating costs are reduced.

It is another object of the present invention to provide a building structure having the heating and cooling apparatus.

It is still another object of the present invention to provide an effective method of heating and cooling using the heating and cooling apparatus of the invention.

The foregoing and other objects of the present invention are carried out by a heating and cooling apparatus comprising a generally hollow heating and cooling tower body having a ceiling part for receiving solar heat and a columnar part for storing the solar heat received by the ceiling part. The columnar part has a lower portion adapted to be positioned in the ground for receiving a flow of cool air from the ground and a heat absorbing-and-radiating section for absorbing and radiating heat to heat the heating and cooling tower body using the stored solar heat and to cool the heating and cooling tower body using the flow of cool air from the ground. Preferably, the heating and cooling tower body is made of a high heat-retaining material.

An infrared-reflecting cover section is mounted over the ceiling part of the heating and cooling tower body for movement between an open position and a closed position. In the open position, the infrared-reflecting cover section exposes the ceiling part to an exterior of the building for receiving solar heat. In the closed position, the infrared-reflecting cover section covers the ceiling part and reflects solar heat so that the ceiling part does not receive the solar heat. Preferably, the infrared-reflecting cover section is covered by a glass cover section.

A first shutter section is mounted in an upper portion of the columnar part and a second shutter section is mounted in a lower portion of the columnar part. The first and second shutter sections are selectively opened and closed to control the flow of solar heat and cool air in the heating and cooling tower body. During heating of the heating and cooling tower body using solar heat, the first shutter section is opened and the lower shutter section is closed. Preferably, if the situation requires it during heating, at least one heater disposed in the heating and cooling tower body is operated. During cooling of the heating and cooling tower body, the first shutter section is closed and the lower shutter section is opened.

In another embodiment, a snow-thawing tank section is connected to the lower portion of the columnar part. Snow stored in the snow-thawing tank section is utilized to generate cool air for cooling the heating and cooling tower body.

In another aspect, the present invention is directed to a building having a heating and cooling apparatus for heating and cooling the interior of the building, such as a room. The heating and cooling apparatus has a heating and cooling tower section for connection to the building. The heating and cooling tower section has a generally hollow heating and cooling tower body made of a high heat-retaining material. The heating and cooling tower body has a ceiling part exposed to an exterior of the building for receiving solar heat and a columnar part for storing the solar heat. An underground heat absorbing-and-radiating section is positioned at a lower portion of the columnar part and is adapted to be positioned in the ground for receiving a flow of cool air from the ground. An aboveground heat absorbing-and-radiating section is positioned at an upper portion of the columnar part and is exposed to the room of the building for directing solar heat stored in the columnar part into the room to heat the room and for directing cool air in the underground heat absorbing-and-radiating section into the room to cool the room.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement and instrumentalities shown. In the drawings.

DETAILED DESCRIPTION OF THE PREFERRED EMBODIMENTS

Figure 1:
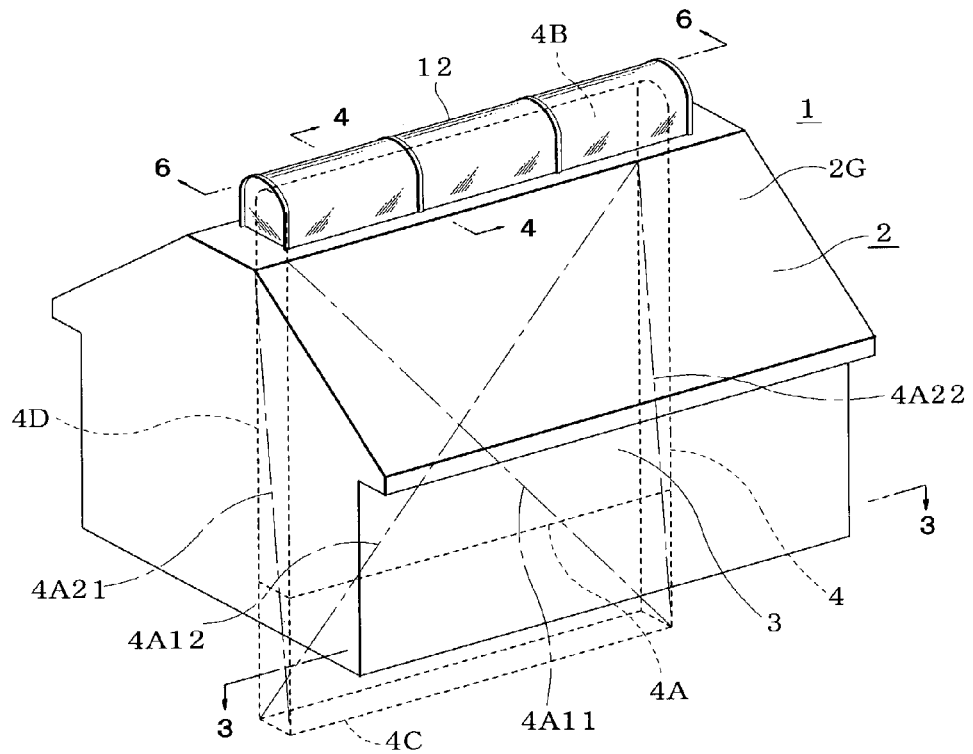
FIG. 1 is a perspective view showing a gable roof-type building equipped with a heating and cooling apparatus according to the present invention.

While this invention is susceptible of embodiments in many different forms, this specification and the accompanying drawings disclose only preferred embodiments of the invention. The invention is not intended to be limited to the embodiments so described, and the scope of the invention will be pointed out in the appended claims.

As used throughout the specification and claims, the term "building" refers to residential and commercial building structures, including single-family houses, multi-family units, townhouses, condominiums, high-rise buildings, warehouses and factories.

Moreover, certain terminology is used in the following description for convenience only and is not intended to be limiting. For purposes of this description, the terms "vertical" and "horizontal" are merely illustrative of relative space positions of the various components in the drawings. In actual practice, it is apparent that the components can be aligned in either orientation. Moreover, the terms "upper", "lower", "front", "rear", "left", "right", "inner" and "outer" designate directions in the drawing to which reference is made. Such terminology includes the terms above specifically mentioned and words of similar import.

Figure 2:
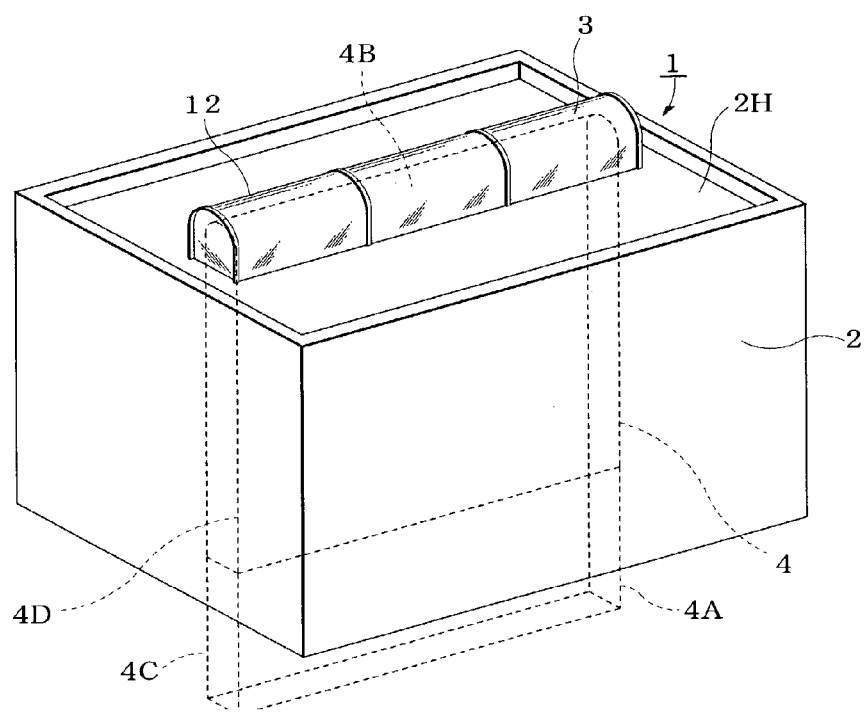
FIG. 2 is a perspective view showing the heating and cooling apparatus of the present invention installed in a building having a flat roof structure.
Figure 3:
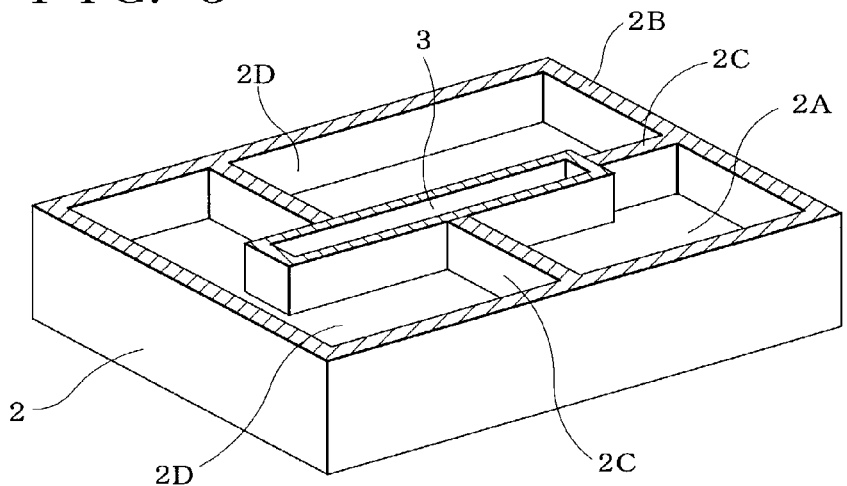
FIG. 3 is a cross-sectional view taken along the line 3—3 of FIG. 1.
Figure 4:
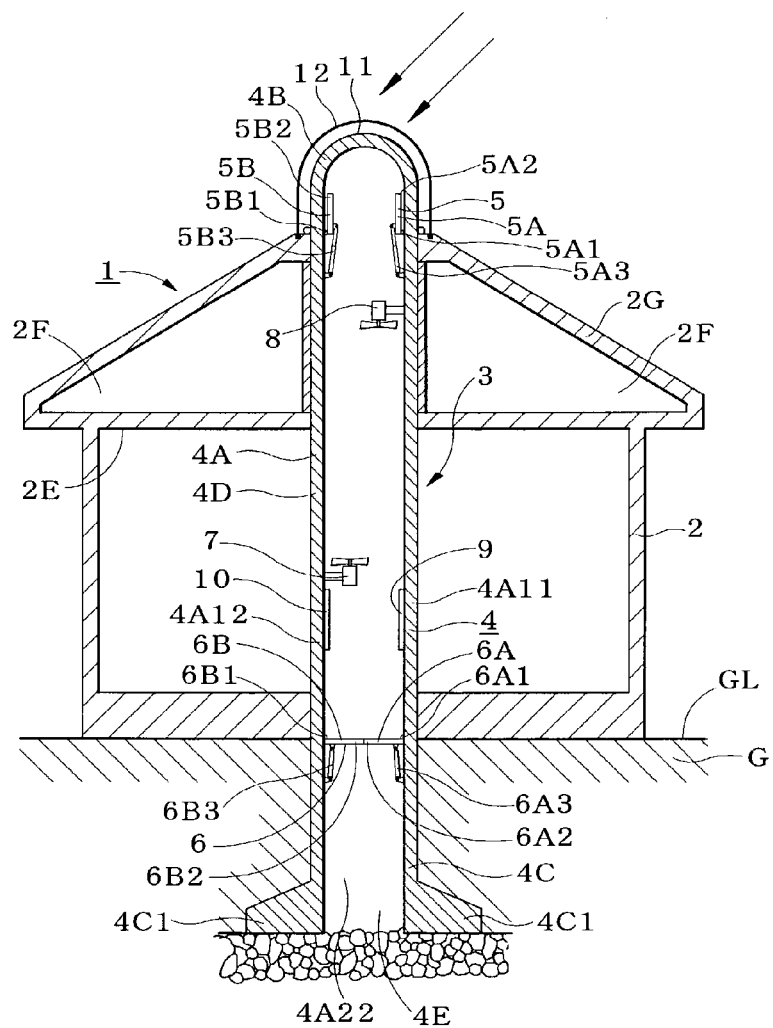
FIG. 4 is a cross-sectional view taken along the line 4—4 of FIG. 1.

FIG. 1 shows a building 2, such as house, equipped with a heating and cooling apparatus, generally designated at 1, according to the present invention. The building 2 includes a foundation, a floor 2A, an outside wall 2B, a room divider 2C and a room 2D as shown in FIG. 3, and a ceiling 2E, an attic 2F and a roof 2G as shown in FIG. 4. The building 2 shown in FIG. 1 has a gable roof 2G. However, buildings having other types of roof structures, such as a flat roof 2H shown in FIG. 2, are also suitable for use with the heating and cooling apparatus 1.

Referring to FIG. 4, the heating and cooling apparatus 1 has a cooling tower section 3 extending generally vertically through the building 2. The heating and cooling tower section 3 comprises a generally hollow heating and cooling tower body 4. An upper shutter section 5, a lower shutter section 6, upward convection fans 7, downward convection fans 8, forward heaters 9, and rearward heaters 10 are disposed in the heating and cooling tower body 4. An infrared-reflecting cover section 11 and an upper glass cover section 12 are disposed at an upper portion of the heating and cooling tower body 4.

Figure 6:
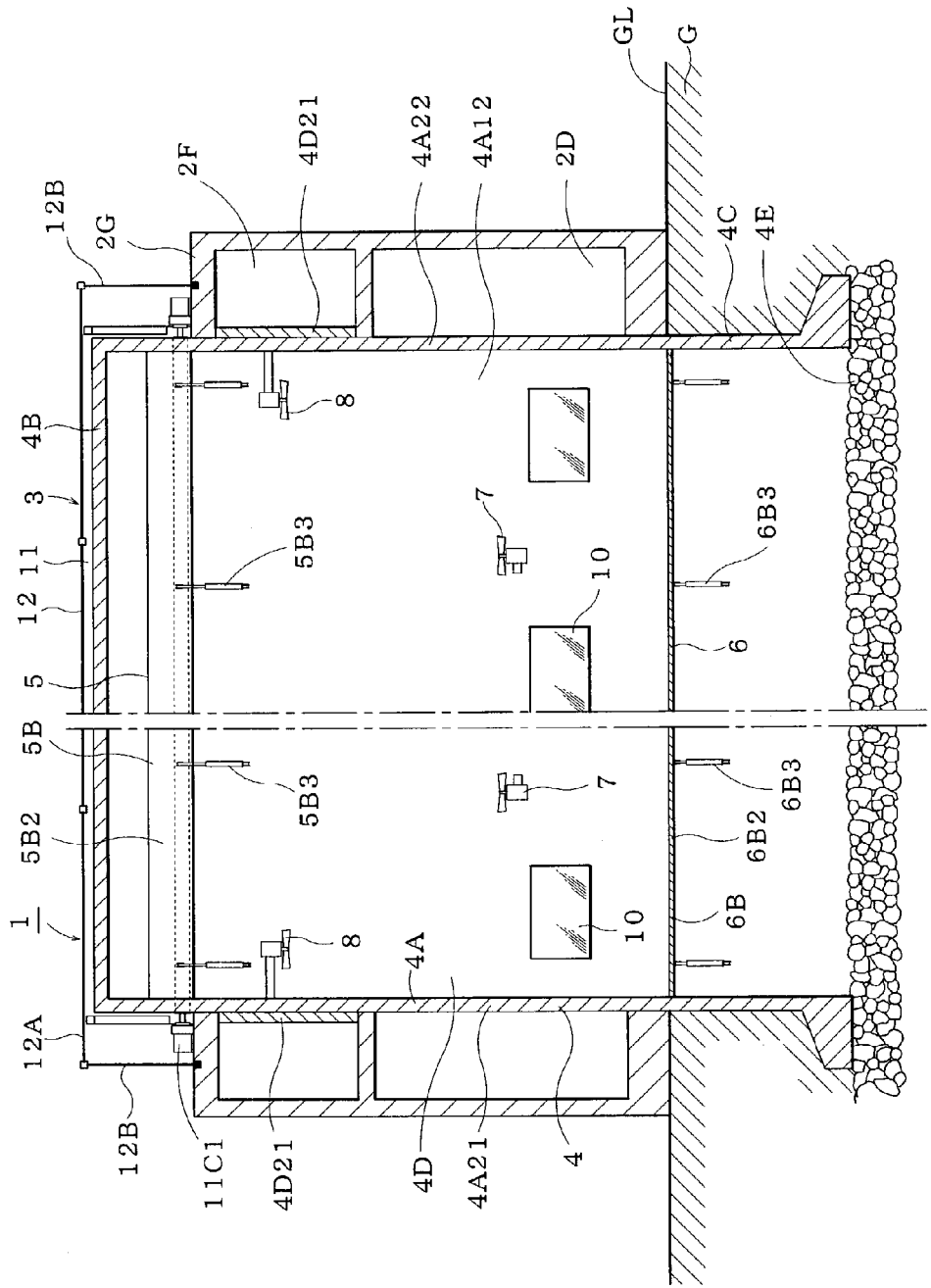
FIG. 6 is a cross-sectional view taken along the line 6—6 of FIG. 1.

The heating and cooling tower body 4 has a columnar part 4A of a predetermined height which is entirely made of a material having a high heat-retaining property such as reinforced concrete, bricks or concrete blocks. As shown in FIGS. 4 and 6, the columnar part 4A has front and rear faces 4A11, 4A12, right and left faces 4A21, 4A22 with right and left sides thereof connected to each other in the horizontally lengthwise direction so as to form a rectangular-shaped column, and a reversed U-shaped ceiling part 4B sealingly connected to the upper end of the columnar part 4A. The columnar part 4A is divided into an underground heat absorbing-and-radiating section 4C at the lower portion and an aboveground heat absorbing-and-radiating section 4D at the upper portion. The underground heat absorbing-and-radiating part 4C is buried in the ground at a predetermined depth from the ground surface GL. A lower end of the underground heat absorbing-and-radiating section 4C has a foundation 4C1 and an open section 4E.

In the embodiment shown in the figures, the ceiling part 4B is unitarily formed with the columnar part 4A. Alternatively, the ceiling part 4B may be separately prepared and then sealingly connected to the columnar part 4A. The ceiling part 4B is disposed so that it is exposed to the exterior of the building from the gable roof 2G (FIG. 1) or the flat roof 2H (FIG. 2) of the building 2.

Figure 5:
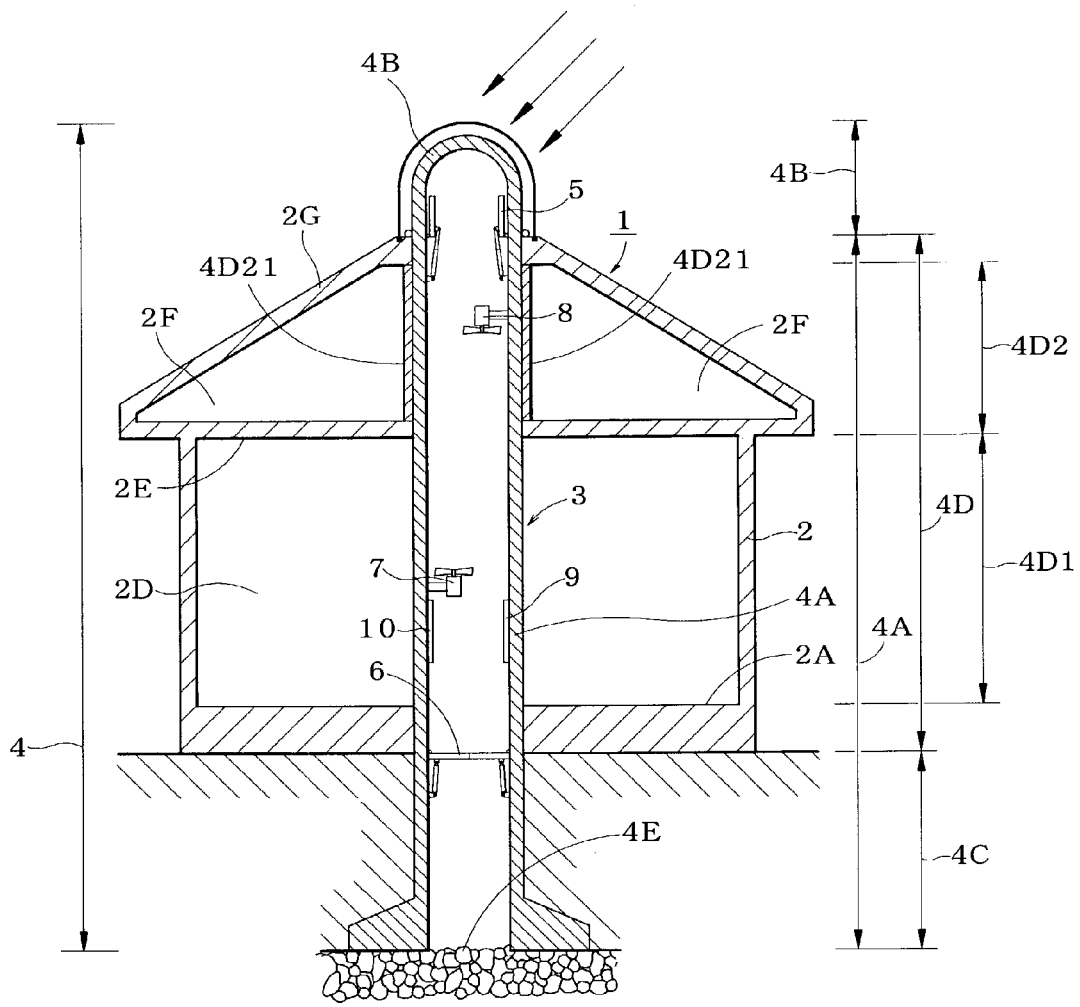
FIG. 5 is an explanatory view of the heating and cooling tower body of the heating and cooling apparatus of the present invention.

Referring to FIG. 5, the surface of a section of the aboveground heat absorbing-and-radiating section 4D denoted by 4D1 at the upper portion of the columnar part 4A is exposed to the room 2D of the building 2. The surface of a section of the aboveground heat absorbing-and-radiating section 4D denoted by 4D2 which corresponds to the attic 2F is covered with a heat-insulating material 4D21. When the heating and cooling tower body 4 extends through a central portion of the building 2, as viewed in the horizontal direction of FIGS. 4 and 5, it is possible to release hot air or cool air to each room of the building as further described below.

Figure 8:
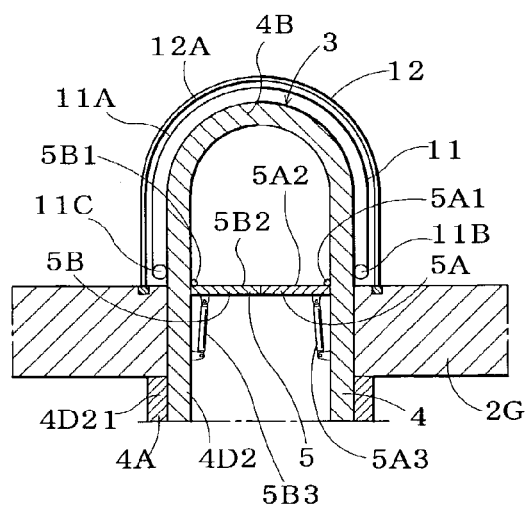
FIG. 8 is a cross-sectional view of the ceiling section.

Referring to FIGS. 4, 6 and 8, the upper shutter section 5 are mounted at the upper end of the columnar part 4A and has a forward upper shutter 5A and a rearward upper shutter 5B. The forward upper shutter 5A has a preselected number of hinges 5A1 which are disposed along the front face 4A11 of the columnar part 4A and are spaced in the direction from right to left of FIG. 6. Shutter plates 5A2 formed of a heat insulating material are mounted to the upper part of the columnar part 4A by the hinges 5A1 so that the shutter plates 5A2 may be pivoted between a raised position (i.e., an open position) and a lowered position (i.e., a closed position). A preselected number of cylinders 5A3 are disposed between the shutter plates 5A2 and the front face 4A11 of the columnar part 4A for raising and lowering the shutter plates 5A2.

The rearward upper shutter 5B has a preselected number of hinges 5B1 which are disposed along the rear face 4A12 of the columnar part 4A and are spaced in the direction from right to left of FIG. 6. Shutter plates 5B2 formed of a heat insulating material are mounted to the upper part of the columnar part 4A by the hinges 5B1 so that the shutter plates 5B2 may be pivoted between a raised position (i.e., an open position) and a lowered position (i.e., a closed position). A preselected number of cylinders 5B3 are disposed between the shutter plates 5B2 and the rear face 4A12 of the columnar part 4A for raising and lowering the shutter plates 5B2. When the forward upper shutter 5A and a rearward upper shutter 5B are laid horizontally in the lowered position, the columnar part 4A of the heating and cooling tower body 4 is partitioned into two sections (see FIG. 12). When the forward upper shutter 5A and a rearward upper shutter 5B are in the raised position, the entire interior of the columnar part 4A is communicated vertically (see FIG. 10).

The lower shutter section 6 is mounted on the columnar part 4A along the ground level GL of the ground G and has a forward lower shutter 6A and a rearward lower shutter 6B. The forward lower shutter 6A has a preselected number of hinges 6A1 which are disposed along the front face 4A11 of the columnar part 4A at the ground level GL and are spaced in the direction from right to left of FIG. 6. Shutter plates 6A2 formed of a heat insulating material are mounted to the columnar part 4A by the hinges 6A1 so that the shutter plates 6A2 may be pivoted between a raised position (i.e., an open position) and a lowered position (i.e., a closed position). A preselected number of cylinders 6A3 are disposed between the shutter plates 6A2 and the front face 4A11 of the rectangular columnar part 4A for raising and lowering the shutter plates 6A2.

The rearward lower shutter 6B has a preselected number of hinges 6B1 which are disposed along the rear face 4A12 of the columnar part 4A at the ground level GL and are spaced in the direction from right to left of FIG. 6. Shutter plates 6B2 formed of a heat insulating material are mounted to the columnar part 4A by the hinges 6B1 so that the shutter plates 6B2 may be pivoted between a raised position (i.e., an open position) and a lowered position (i.e., a closed position). A preselected number of cylinders 6B3 are disposed between the shutter plates 6B2 and the rear face 4A12 of the columnar part 4A for raising and lowering the shutter plates 6B2. The lower portion of the columnar part 4A is opened and closed by operating the cylinders for shutter 6A3, 6B3 of the forward lower shutter 6A and the rearward lower shutter 6B.

A plurality of the upward convection fans 7 are mounted in spaced-apart relation along the rear face 4A12 of the columnar part 4A in a direction from right to left in FIG. 6 and are disposed below the aboveground heat absorbing-and-radiating section 4D. A plurality of the downward convection fans 8 are mounted in spaced-apart relation along the front face 4A11 of the columnar part 4A in a direction from right to left in FIG. 6 and are disposed above the aboveground heat absorbing-and-radiating section 4D. During operation, the upward and downward convection fans 7, 8 circulate the solar) heat, the heat generated by the forward and rearward heaters 9, 10, and the cool air from the ground around the interior of the columnar part 4A of the heating and cooling tower body 4.

A plurality of the forward heaters 9 are preferably mounted in spaced-apart relation along the front face 4A11 of the columnar part 4A in a direction from right to left in FIG. 6 and disposed between the upward convection fans 7 and the lower shutter section 6. A plurality of the rearward heaters 10 are preferably mounted in spaced-apart relation along the rear face 4A12 of the columnar part 4A in a direction from right to left in FIG. 6 and disposed between the upward convection fans 7 and the lower shutter section 6. Sources of heat for the forward and rearward heaters 9, 10 include, for example, electricity, oil, and hot water.

Figure 7:
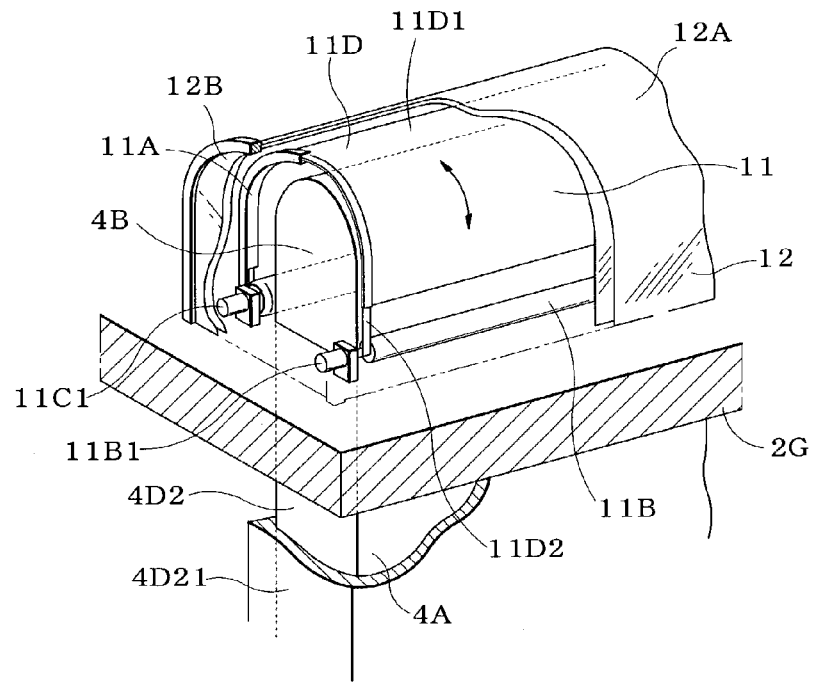
FIG. 7 is an enlarged perspective view showing a ceiling section of the heating and cooling apparatus of the present invention.
Figure 9:
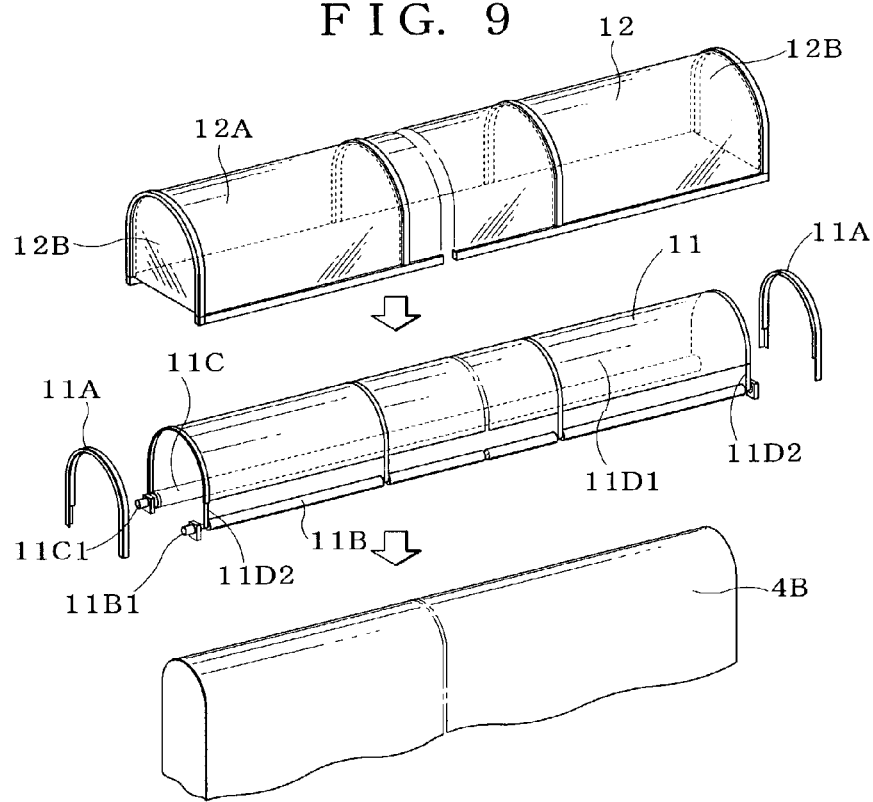
FIG. 9 is an exploded perspective view showing the relation between the ceiling section, an infrared-reflecting cover section and an upper glass cover section of the heating and cooling apparatus of the present invention.

Referring to FIGS. 7–9, the infrared-reflecting cover section 11 comprises sheet guides 11A, a forward winding roller 11B, a rear winding roller 11C and an infrared-reflecting sheet 11D. Each of the sheet guides 11A has a reverse U-shape as viewed in the orientation shown in FIGS. 7–9. The sheet guides 11A are spaced-apart in a longitudinal direction of the infrared-reflecting cover section 11 in such a state that the infrared-reflecting cover section 11 can cover the upper part of the ceiling part 4B. The forward winding roller 11B extends in the direction from the right to left in FIGS. 7–9 and is disposed at forward lower ends of the sheet guides 11A in such a state that the forward winding roller is rotatable in both frontward and rearward directions. A reversible motor 11B1 is disposed at a terminal end of the forward winding roller 11B to rotationally drive the forward winding roller. The rearward winding roller 11C extends in the direction from the right to left in FIGS. 7–9 and is disposed at the rearward lower end of the sheet guides 11A in such a state that the rearward winding roller is rotatable in both frontward and rearward directions. A reversible motor 11C1 is disposed at a terminal end of the rearward winding roller 11C to rotationally drive the rearward winding roller.

The infrared-reflecting sheet 11D comprises a sheet member 11D1 and a belt 11D2 connected to the front edge of the sheet member. Right and left edges of the sheet member 11D1 are loosely fitted and guided in the sheet guides 11A. A rear end of the sheet member 11D1 is connected to the rearward winding roller 11C, and a front end of the belt 11D2 is connected to the forward winding roller 11B. By this structure, when the sheet member 11D1 is wound up by the rearward winding roller 11C, the ceiling section 4B is exposed, and when the belt 11D2 is wound up by the forward winding roller 11B, the ceiling part 4B is covered with the sheet member 11D1. It will be understood by those skilled in the art that the reversible motors 11B1, 11C1 may be operated by a manual switch, or may be automatically operated by providing an appropriate sensor or timer.

The upper glass cover section 12 comprises an elongated reverse U-shaped cover body 12A for covering the infrared-reflecting cover section 11 and a pair of side plates 12B disposed at right and left side surfaces of the cover body. The cover body 12A and the side plates 12B are preferably made of laminated glass.

Figure 10:
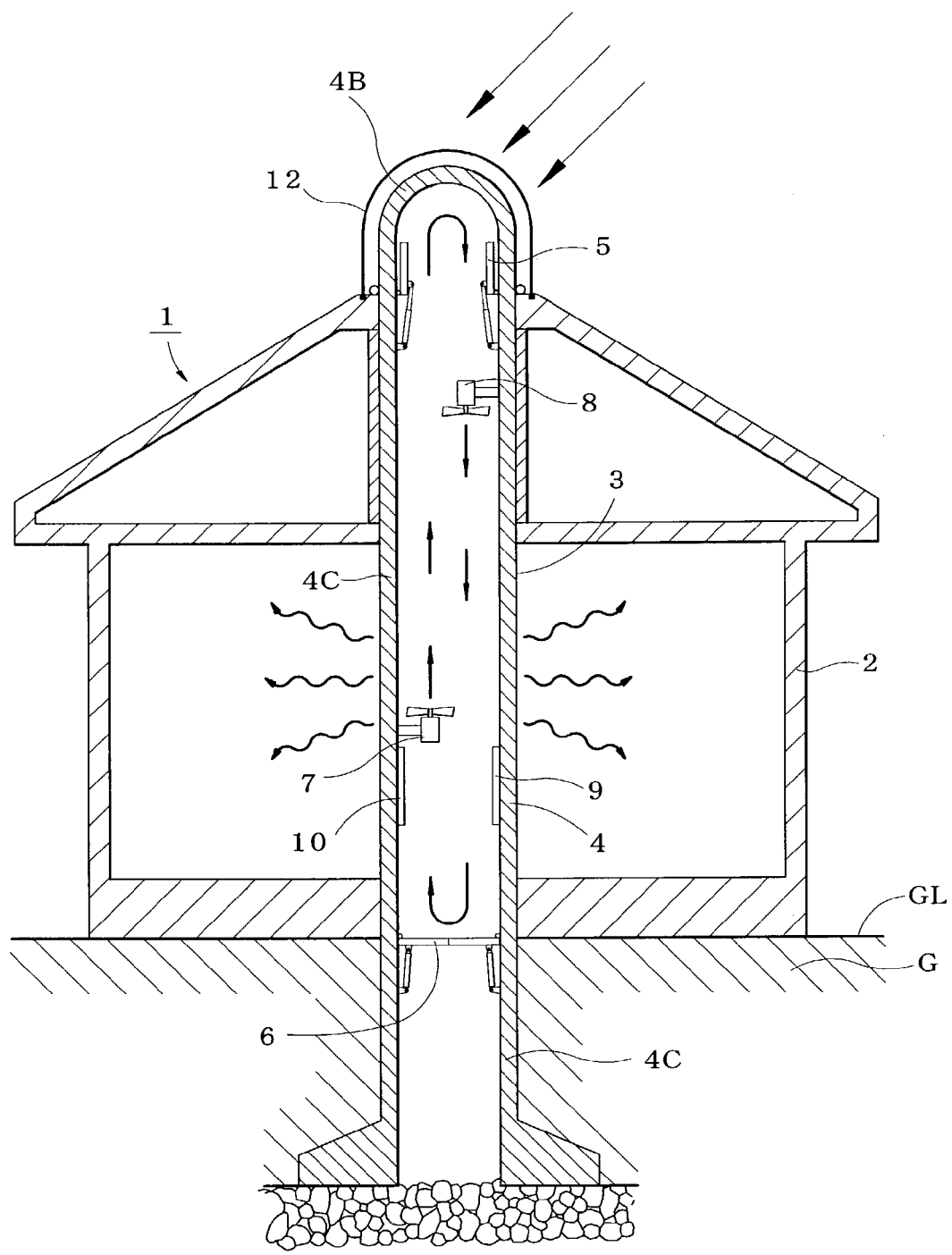
FIG. 10 is an explanatory view showing a cross-section of the heating and cooling tower body during use for heating.
Figure 11:
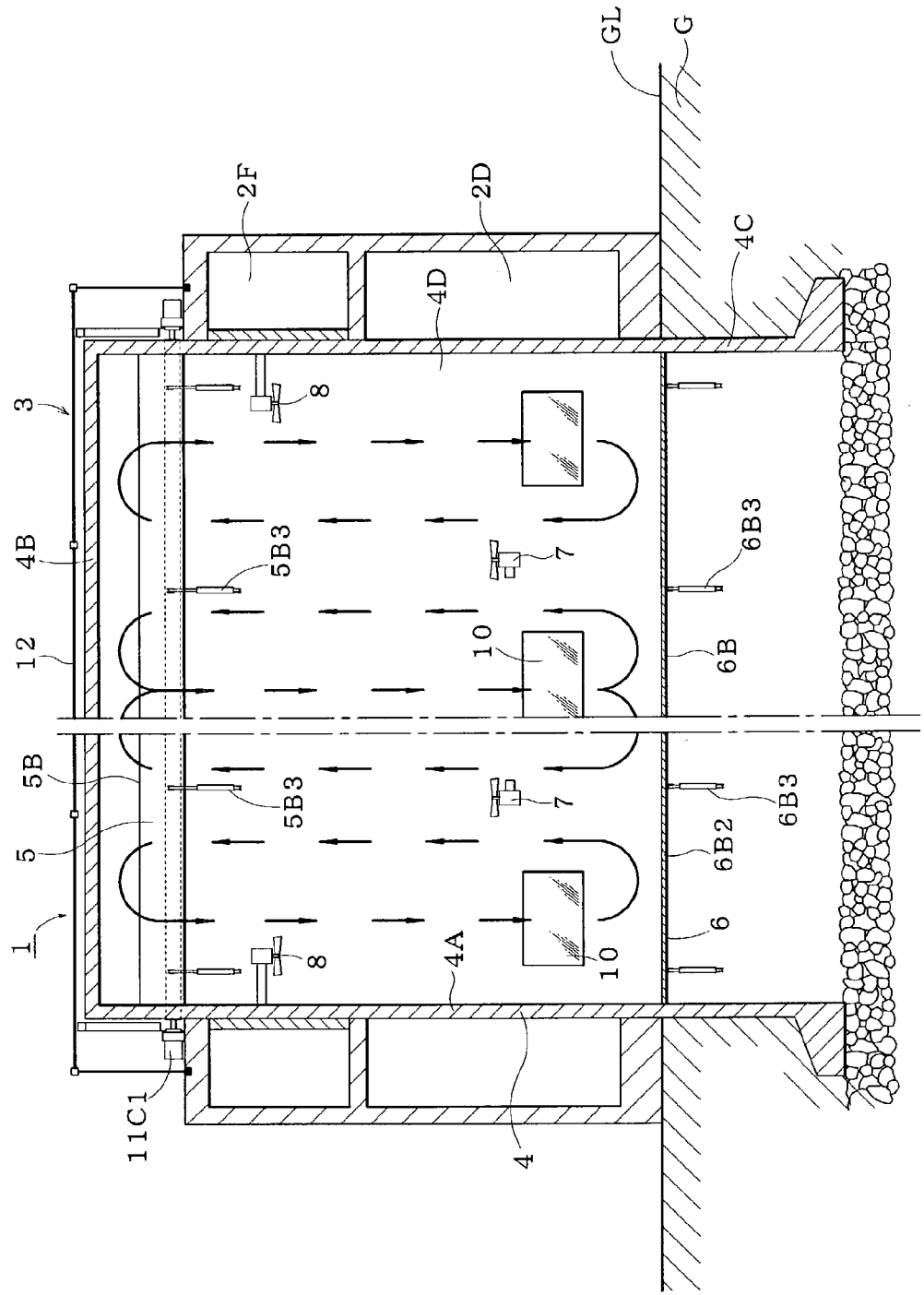
FIG. 11 is an explanatory view showing the heating and cooling tower body during use for heating.

Operation of the heating and cooling apparatus 1 to heat the interior of the building 2 using solar heat is described below with reference to FIGS. 10–11.

To begin heating the interior of the building 2 using solar heat, the upper shutter section 5 is opened, the lower shutter section 6 is closed, the infrared-reflecting cover section 11 is opened, and the upward convention fan 7 and the downward convection fan 8 are operated. Further, if it is difficult to obtain an adequate warming effect by this operation, the forward heater 9 and the rearward heater 10 are operated, and the heat of the forward heater 9 and the rearward heater 10 is filled into the heating and cooling tower body 4 and stored in the columnar part 4A. When the infrared-reflecting cover section 11 is opened, solar heat is introduced into the heating and cooling tower body 4. The solar heat is then absorbed and stored in the heating and cooling tower body, particularly in the columnar part 4A. The solar heat is released into the room by heat radiation via the wall of the heating and cooling tower body. At this stage, by operating the upward convention fan 7 and the downward convection fan 8, the temperature in the heating and cooling tower body can be made constant rapidly. Furthermore, since the heating and cooling tower body is made of a material having a high heat-retaining property, heat which is stored in the heating and cooling tower body in the daytime is sufficiently adequate for warming the interior of the building even in the nighttime.

Figure 12:
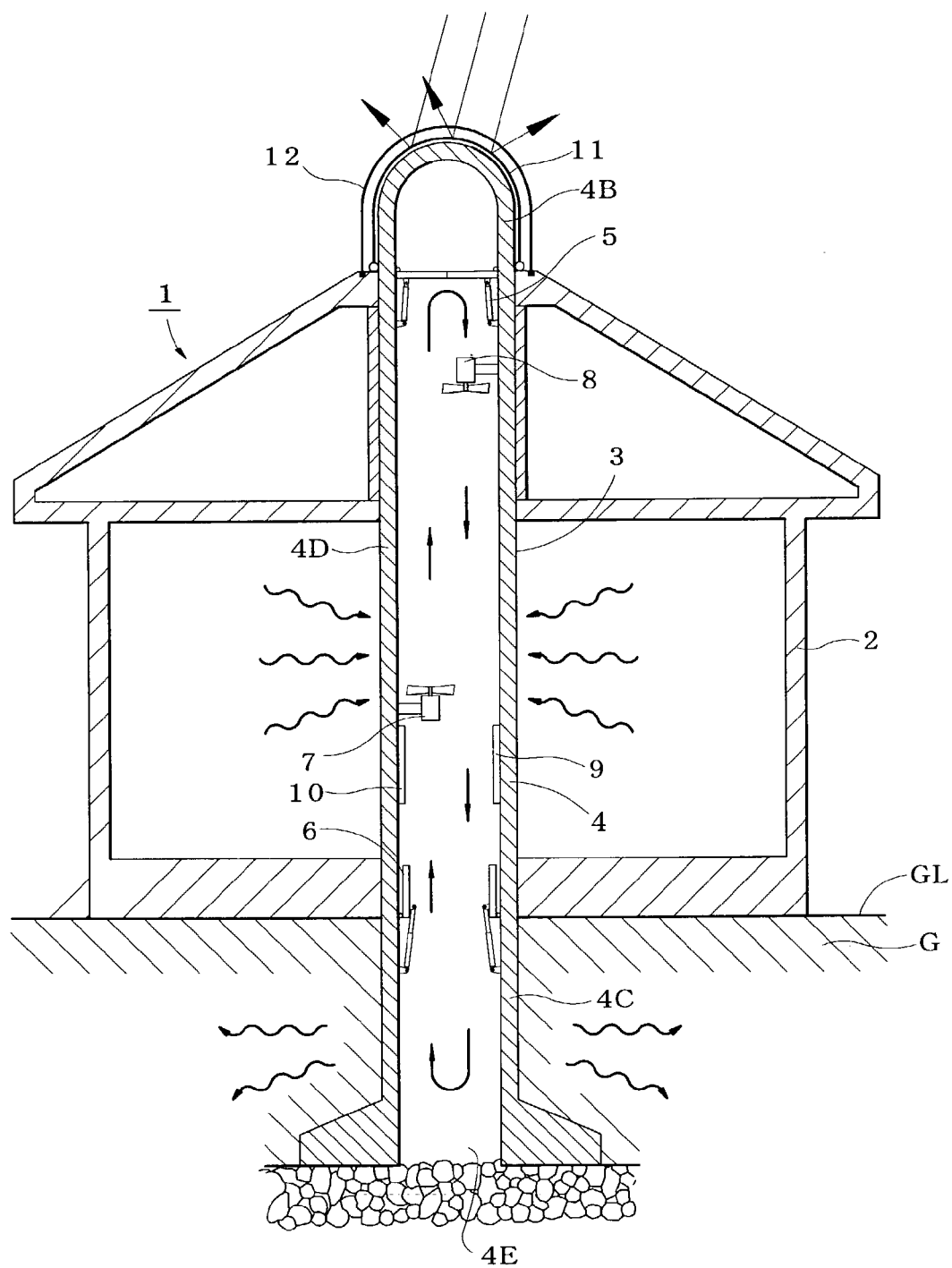
FIG. 12 is an explanatory view showing a cross section of the heating and cooling tower body during use for cooling.
Figure 13:
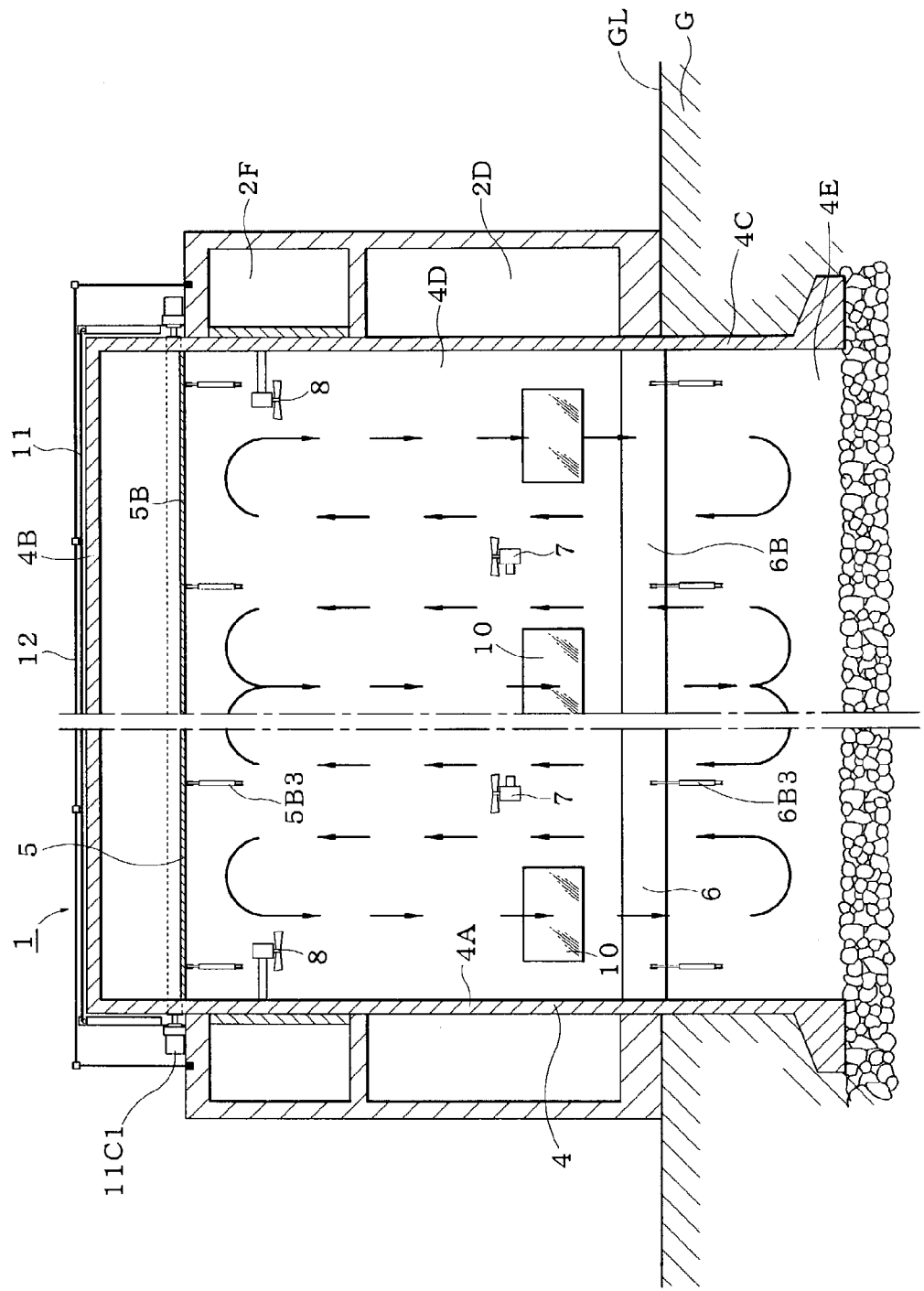
FIG. 13 is an explanatory view showing the heating and cooling tower body during use for cooling.

Operation of the heating and cooling apparatus 1 to cool the interior of the building 2 using cool air in the ground is described below with reference to FIGS. 12–13.

To begin cooling the interior of the building 2 using cool air in the ground, the upper shutter section 5 is closed, the lower shutter section 6 is opened, the infrared-reflecting cover section 11 is closed, and the upward convention fan 7 and the downward convection fan 8 are operated. As a result, the cool air in the ground, whose temperature is generally constant throughout a particular year, enters through the open section 4E at the lower end of the underground heat absorbing-and-radiating section 4C, fills the heating and cooling tower body 4, is stored in the columnar part 4A, and is released into the rooms of the building 2 over a period of time via the wall of the columnar part 4A to cool the inside of the building 2. In this case also, by operating the upward convection fan 7 and the downward convection fan 8, the temperature in the heating and cooling tower body 4 can be made constant rapidly and effectively.

Figure 14:
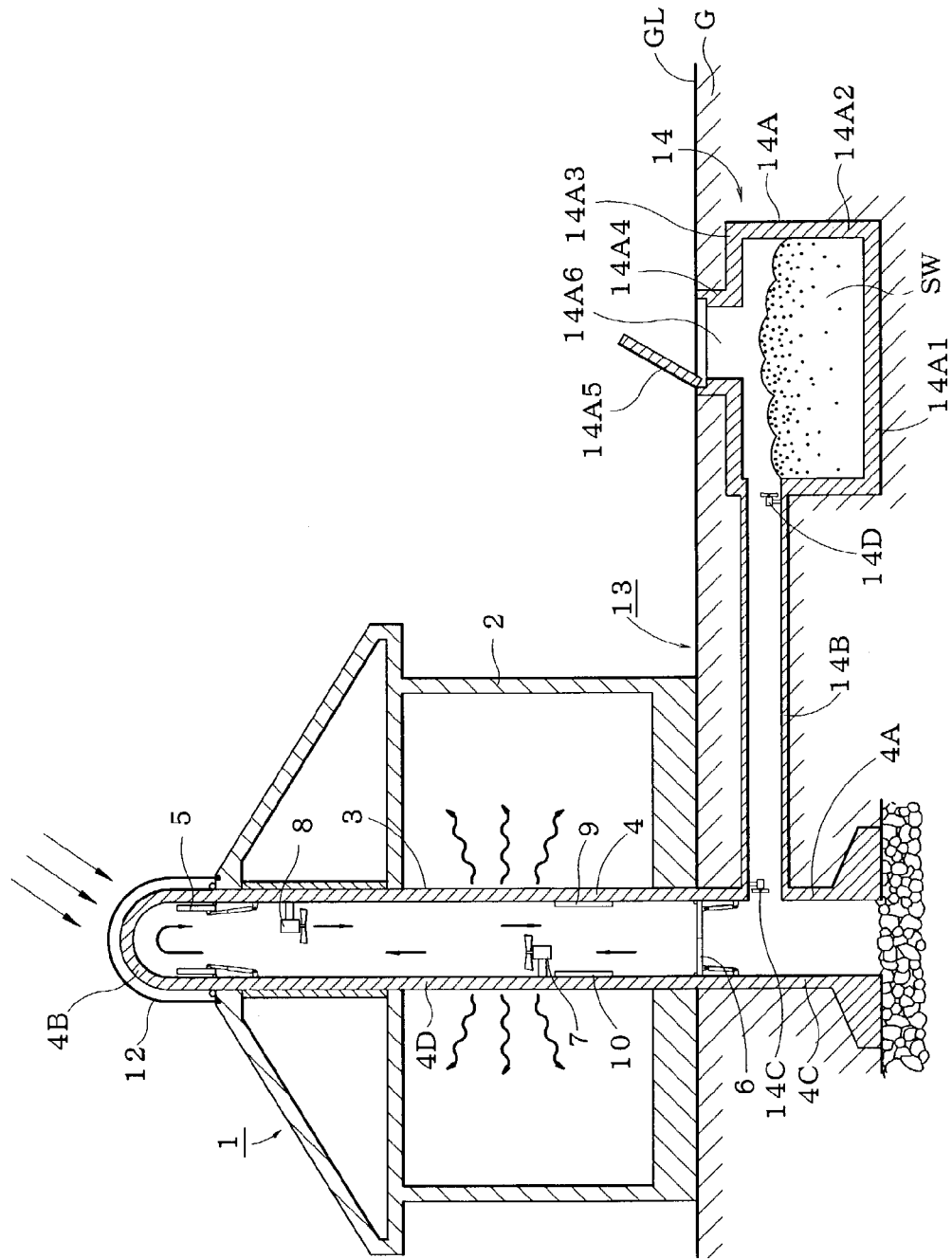
FIG. 14 is a cross-sectional view showing an embodiment of the heating and cooling apparatus using a snow-thawing tank section during use for heating.
Figure 15:
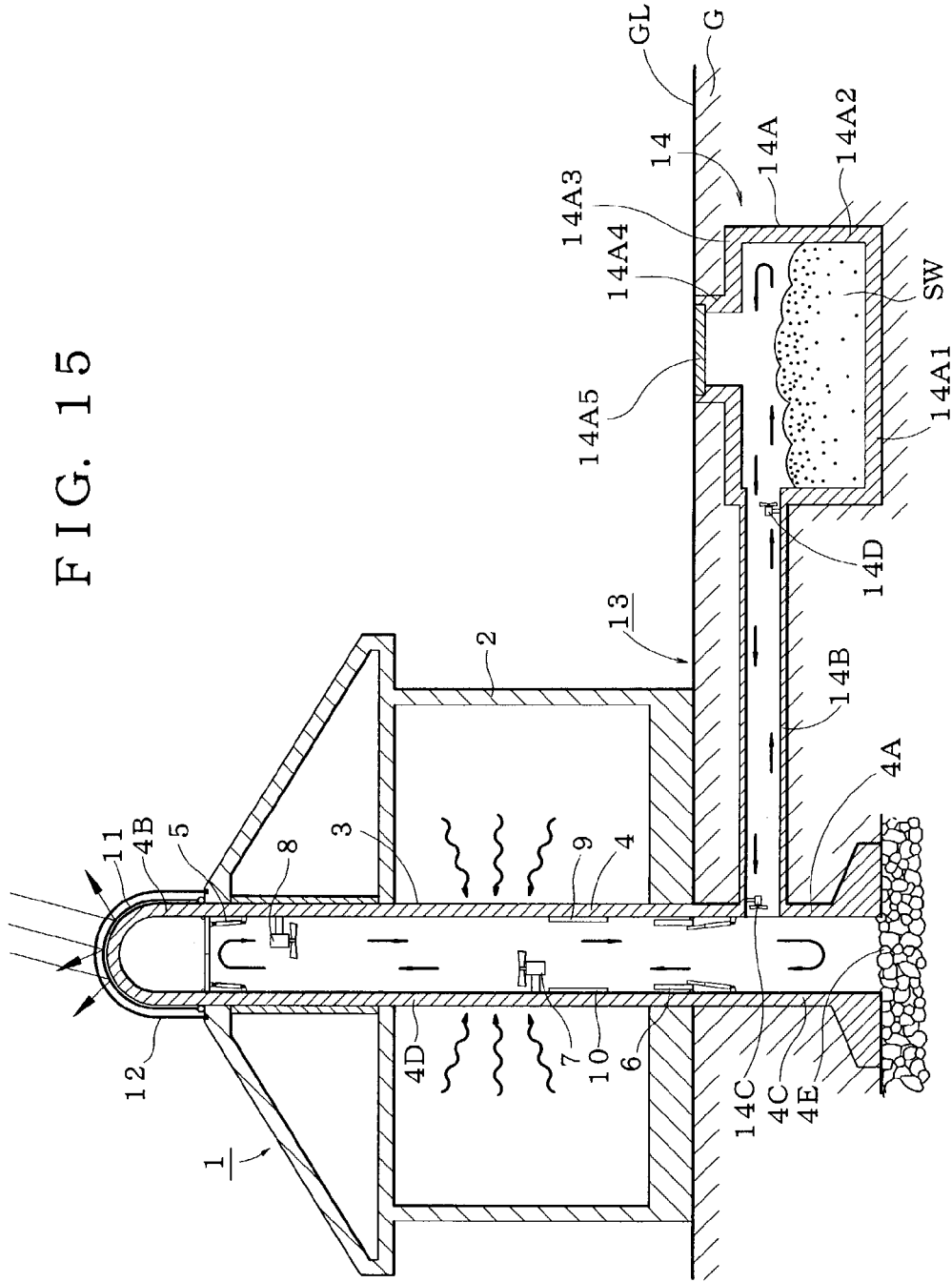
FIG. 15 is a cross-sectional view showing an embodiment of the heating and cooling apparatus using a snow-thawing tank section during use for cooling.

FIGS. 14–15 show another embodiment of the heating and cooling apparatus 13 according to the present invention. This embodiment differs from the embodiment shown in FIGS. 1–12 in that it further incorporates a snow-thawing tank section 14 which stores snow SW as the source for the cool air, rather than cool air directly from the ground, for cooling the interior of the building 2. The common reference numerals in FIGS. 1–12 and 14–15 indicate the same components.

The snow-thawing tank section 14 comprises a snow-thawing tank body 14A for storing the snow SW, a horizontal connecting pipe 14B, a first convection fan 14C and a second convection fan 14D. The snow-thawing tank body 14A has a bottom 14A1, a side wall 14A2 extending upwardly from and connected to the bottom 14A1, a ceiling plate 14A3 provided at an upper face of the side wall 14A2, a cylindrical portion 14A4 extending upwardly from and connected to the ceiling plate 14A3 and defining a snow-throwing port 14A6 through which the snow SW is filled into the snow-thawing tank body 14A, and a lid 14A5 for opening and closing the snow-throwing port 14A6. The snow-thawing tank body 14A is buried in the ground near the building 2.

The horizontal connecting pipe 14B connects the side wall 14A2 of the snow-thawing tank body 14A to the columnar part 4A of the heating and cooling tower body 4. The convection fan 14C is disposed at the connecting portion of the horizontal connecting pipe 14B and the columnar part 4A for directing cool air toward the heating and cooling tower body 4. The second convection fan 14D is disposed at the connecting portion of the horizontal connecting pipe 14B and the snow-thawing tank body 14A for directing air toward the snow-thawing tank body 14A.

Heating of the interior of the building 2 using the heating and cooling apparatus of FIG. 14 is accomplished by first opening the lid 14A5 of the snow-thawing tank body 14A. Thereafter the upper shutter section 5 is opened, the lower shutter section 6 is closed, the infrared-reflecting cover section 11 is opened, the upward convention fan 7 and the downward convection fan 8 are operated, the forward heater 9 and the rearward heater 10 are operated, and the first convection fan 14C and the second convection fan 14D are operated. When the infrared-reflecting cover section 11 is opened, solar heat is introduced into the heating and cooling tower body 4. The solar heat is then absorbed and stored in the heating and cooling tower body, particularly in the columnar part 4A. The solar heat is released into the room by heat radiation via the wall of the heating and cooling tower body. At this stage, by operating the upward convention fan 7 and the downward convection fan 8, the temperature in the heating and cooling tower body can be made constant rapidly. Furthermore, since the heating and cooling tower body is made of a material having a high heat-retaining property, heat which is stored in the heating and cooling tower body in the daytime is sufficiently adequate for warming the interior of the building even in the nighttime.

Cooling of the interior of the building 2 using the heating and cooling apparatus of FIG. 15 is accomplished by first closing the lid 14A5 of the snow-thawing tank body 14A containing the snow SW. Thereafter, the upper shutter section 5 is closed, the lower shutter section 6 is opened, the infrared-reflecting cover section 11 is closed, and the upward convention fan 7 and the downward convection fan 8 are operated. Cool air released by thawing of the snow SW then enters through the open section 4E at the lower end of the underground heat absorbing-and-radiating section 4C, fills the heating and cooling tower body 4, is stored in the columnar part 4A, and is released into the rooms of the building 2 over a period of time via the wall of the columnar part 4A to cool the interior of the building 2. In this case also, by operating the upward convention fan 7 and the downward convection fan 8, the temperature in the heating and cooling tower body 4 can be made constant rapidly and effectively.

In the foregoing embodiments of the heating and cooling apparatus according to the invention, heating and cooling with high efficiency can be achieved by forming the heating and cooling tower body 4 of a material with a high heat-retaining property, such as concrete, bricks or concrete blocks. The heating and cooling tower section 3 is preferably constructed such that it may structurally stand in the building in such a state that the ceiling section 4B is exposed at the upper portion of the aboveground heat absorbing-and-radiating section 4D and at the same time, the aboveground heat absorbing-and-radiating section is located at the center of the building. Further, if the surface of the heating and cooling tower body 4 which faces the inside of the room is unfinished (e.g. does not contain any decorational material), heat can be radiated directly from the surface of the heating and cooling tower body, thereby further enhancing the heating and cooling of the room.

According to the heating and cooling apparatus of the present invention, since heating and cooling of a room in the building is accomplished by radiation of heat from a side of the room in which the cooling tower body is exposed, a comfortable ambient temperature can be maintained in the room. Furthermore, since the heating and cooling tower body is made of a material having a high heat-retaining property and the area for heating and cooling can be made large, heating and cooling of the interior of the building are achieved with high efficiency. Additionally, since solar heat is used to heat the interior of the building, and since cool air from below the ground or from snow stored below the ground is used to cool the interior of the building, cooling and heating costs are substantially reduced. Moreover, the heating and cooling apparatus of the present invention is relatively maintenance free and economical to manufacture and install, particularly if installed during construction of the building.

From the foregoing description, it can be seen that the present invention comprises an improved heating and cooling apparatus, a building structure having the heating and cooling apparatus, and a method of using the heating and cooling apparatus. It will be appreciated by those skilled the art that obvious changes could be made to the embodiments described in the foregoing description without departing from the broad inventive concept thereof. It is understood, therefore, that this invention is not limited to the particular embodiments disclosed, but is intended to cover all modifications thereof which are within the scope and spirit of the invention as defined by the appended claims.

I claim:

1. A heating and cooling apparatus comprising: a generally hollow heating and cooling tower body having a ceiling part for receiving solar heat and a columnar part for storing the solar heat received by the ceiling part, the columnar part having a lower portion adapted to be positioned in the ground for receiving a flow of cool air from the ground and a heat absorbing-and-radiating section for absorbing and radiating heat to heat the heating and cooling tower body using the stored solar heat and to cool the heating and cooling tower body using the flow of cool air from the ground; an upper shutter section mounted at an upper portion of the heat absorbing-and-radiating section for undergoing movement between an open position and a closed position to place the columnar part into and out of communication with the ceiling part, respectively; a lower shutter section mounted at the lower portion of the columnar part for undergoing movement between an open position and a closed position to place the columnar part into and out of communication with the ground, respectively; a downward convection fan disposed at the upper portion of the heat absorbing-and-radiating section; an upward convection fan disposed at the lower portion of the columnar part; and a heater disposed between the lower shutter section and the upward convection fan.

2. A heating and cooling apparatus according to claim 1; wherein the heating and cooling tower body is made of a high heat-retaining material.

3. A heating and cooling apparatus according to claim 2; wherein the high heat-retaining material comprises reinforced concrete.

4. A heating and cooling apparatus according to claim 1; wherein the columnar part of the heating and cooling tower body is generally rectangular-shaped.

5. A heating and cooling apparatus according to claim 1; further comprising a heater mounted in the columnar part for heating the solar heat.

6. A heating and cooling apparatus according to claim 1; further comprising an infrared-reflecting cover section for covering the ceiling part of the heating and cooling tower body.

7. A heating and cooling apparatus according to claim 6; further comprising a glass cover section for covering the infrared-reflecting cover section.

8. A heating and cooling apparatus according to claim 1; further comprising a snow-thawing tank section for storing snow and adapted to be buried in the ground; and a pipe connecting the lower portion of the columnar part to the snow-thawing tank section.

9. A heating and cooling apparatus comprising: a generally hollow heating and cooling tower body having a ceiling part for receiving solar heat and a columnar part for storing the solar heat received by the ceiling part, the columnar part having a lower portion adapted to be positioned in the ground for receiving a flow of cool air from the ground and a heat absorbing-and-radiating section for absorbing and radiating heat to heat the heating and cooling tower body using the stored solar heat and to cool the heating and cooling tower body using the flow of cool air from the ground; a snow-thawing tank section for storing snow and adapted to be buried in the ground; a pipe connecting the lower portion of the columnar part to the snow-thawing tank section; an upper shutter section mounted at an upper portion of the heat absorbing-and-radiating section for undergoing movement between an open position and a closed position to place the columnar part into and out of communication with the ceiling part, respectively; a lower shutter section mounted at the lower portion of the columnar part for undergoing movement between an open position and a closed position to place the columnar part into and out of communication with the ground, respectively; a downward convection fan disposed at the upper portion of the heat absorbing-and-radiating section; and an upward convection fan disposed at the lower portion of the columnar part.

10. A method of using a heating and cooling apparatus to cool a room in a building, comprising the steps of:

providing a heating and cooling apparatus comprised of a generally hollow ceiling part extending exteriorly from a roof structure of a building for absorbing solar heat, a generally hollow columnar part for storing the solar heat absorbed by the ceiling part and having a lower portion disposed in the ground for receiving a flow of cool air from the ground and a heat absorbing-and-radiating section disposed adjacent to a room in the building for absorbing and radiating heat, an infrared-reflecting cover section mounted over the ceiling part to undergo movement between an open position in which the ceiling part is exposed to solar heat and a closing position in which the ceiling part is shielded from solar heat, an upper shutter section mounted at an upper portion of the heat absorbing-and-radiating section for undergoing movement between an open position and a closed position to place the columnar part in and out of communication with the ceiling part, respectively, and a lower shutter section mounted at the lower portion of the columnar part for undergoing movement between an open position and a closed position to place the columnar part in and out of communication with the ground, respectively;

closing the infrared-reflecting cover section to shield the ceiling part from solar heat;

closing the upper shutter section to place the columnar part out of communication with the ceiling part; and opening the lower shutter section to place the columnar part in communication with the ground so that cool air in the ground flows into the columnar part and heat in the room of the building is absorbed and radiated out of the room by the heat absorbing-and-radiating section to cool the room.

* * * * *